May 14, 1935.  E. E. MOUTOUX  2,001,468
BAIT OR MINNOW BOX
Filed Aug. 4, 1934

Inventor
Emil E. Moutoux
By
Geo. P. Kimmel
Attorney

Patented May 14, 1935

2,001,468

UNITED STATES PATENT OFFICE 2,001,468

BAIT OR MINNOW BOX

Emil E. Moutoux, Riverhead, N. Y.

Application August 4, 1934, Serial No. 738,521

3 Claims. (Cl. 43—55)

My present invention relates generally to what are commonly known as bait boxes or bait cars for the preservation of live bait while fishing where such boxes or cars can be placed in the water and the shrimp, minnows, killies and the like contained therein in their natural habitat in the water, with ample ventilation to assure their life throughout at least a day as far as proper maintenance is concerned.

It is known however that a varying proportion of such bait die in the boxes or cars, not for the lack of proper living conditions, but due to the frequent and many times, rough handling to which they have been subjected, and at the end of a day's fishing it frequently becomes a problem to properly cleanse the box or car and prevent subsequent unpleasant odors.

My primary object is to provide a box or car which will assure proper preservation of all uninjured live bait and which will permit of really thorough cleaning of the box at the end of the fishing excursion, so that in disuse, or storage between uses, the box will be entirely sanitary and lacking in undesirable odors.

Figure 1:
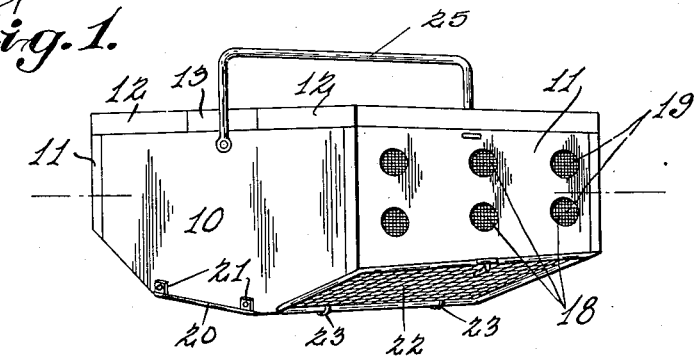

With the above in mind, my invention will be better understood and more thoroughly appreciated by reference to the detailed description of its several parts in the course of the following specification, and by reference to the accompanying drawing, forming a part of this specification, and wherein Figure 1 is a perspective view of my improved bait box or car.

Figure 2:
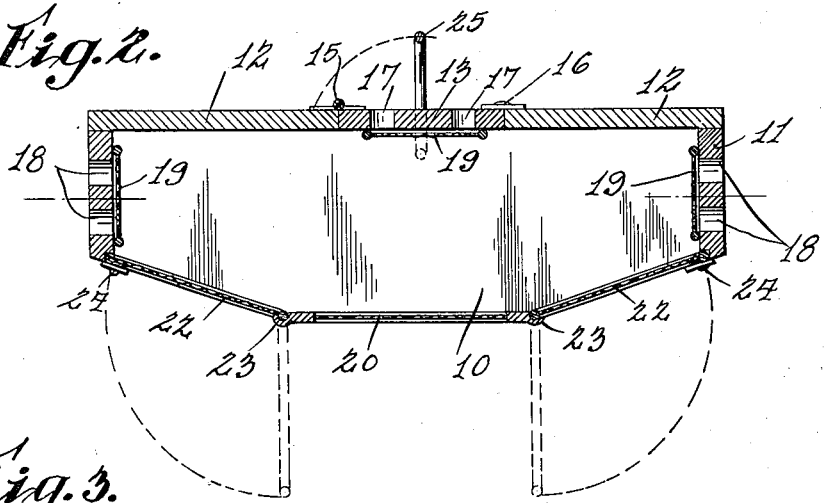
Figure 3:
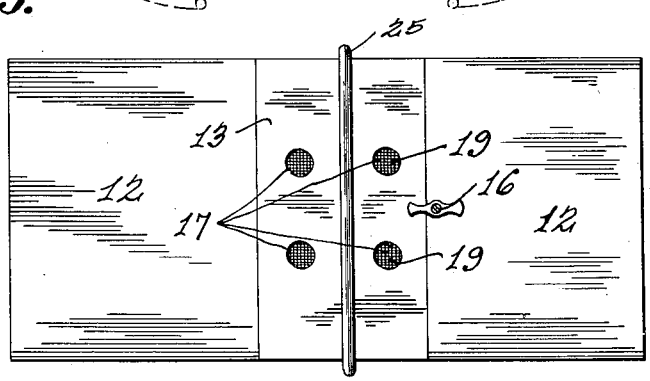

Figure 2 is a vertical, longitudinal sectional view taken approximately centrally thereof, and, Figure 3 is a top plan view.

Referring now to these figures my invention provides a generally rectangular box or car having side walls 10, end walls 11 and a flat top in three sections of which the central section 13 is connected to the side walls 10, and the two end sections 12 are securely fastened to the upper edges of both the side and end walls 10 and 11.

The central top section 13 is in the nature of a door for placing live bait in, and removing the same from the box in use, and is preferably hinged at one side to one of the top end sections, as at 15, and normally connected to the other top end section, as by means of a latch, 16, release of which permits of opening the door for access to the interior of the box.

The door, 13, and the end walls, 11, are provided with a series of ventilating apertures, 17 and 18 respectively, and the openings 18, of the end walls, 11, are preferably arranged at vertically spaced points so that when the box is floated in the water in use to the normal depth at which it rides, certain of said apertures, 18, will be above, and certain will be below, the waterline indicated in Figure 1. The several openings 17 and 18, are screen covered, and the wire net, 19, or other reticulate or foraminous material used for this purpose is preferably arranged, as seen in Figure 2, upon the inner surfaces of the door and end walls.

The lower edges of the side walls, 10, have portions inclined upwardly toward the end walls, 11, and the base or bottom of the box or car includes a central permanently rigid screen section, 20, securely fastened, as by means of side ears, 21, to the central horizontal edge portions of the side walls, 10, and end screen sections, 22, each of which is hingedly connected at 23, at its inner edge to one outer edge of the central section, 20, so that its outer edge, normally held against the lower edge of the respective end wall, 11, by a latch, 24, will, when latch, 24, is released, drop open, and this not only releases everything within the box, but affords ready easy access to all interior portions thereof for thoroughly cleaning the same.

It is obvious that when the box is in use, with the lower inclined drop doors latched, these doors and the lower openings, 18, of the end walls, 11, permit water currents to pass through the box from end to end, so that the water constantly changes. In a like manner, air constantly changes in the space above the water line through openings 17 and 18.

For convenient handling of the box or car, I preferably provide a bail-like handle, 25, pivoted at its ends to the side walls, 10, so that when not in use it will fall on one of the end sections 12, and avoid any intereference with the free opening of the top door, 13.

What I claim is:

1. A floatable bait box having a generally rectangular body including side and end walls and a top and base, said top comprising two end sections and an intermediate hinged section forming a door by means of which access may normally be had to the interior of the body, said door and said end walls having screen covered openings, and said base comprising a permanent central horizontal screen section, and upwardly, outwardly inclined screen sections hinged at their inner edges to said central section and forming drop doors to permit thorough discharge from the box and cleaning of its entire interior, and latches normally holding said top door and bottom drop doors in position.

2. A floatable bait box having a body consisting of top, side and end walls, and a base having reticulate sections forming drop doors and affording easy access to all portions of the interior of the box, said sections being hingedly mounted at one edge thereof and normally inclined upwardly and outwardly to the lower ends of the end walls, and latches normally holding said sections in their inclined positions permitting water to freely flow through the box.

3. A floatable bait box including a generally rectangular body having its central portion of greater depth than its ends, said body including side and end walls of which the lower edges of the side walls are inclined upwardly and outwardly to the end walls, a top having a door for access in use to the interior of the box, and a base including a pair of reticulate sections hinged at their inner edges to swing downwardly and normally inclined upwardly and outwardly to, and latched in connection with, the end walls, said base sections normally permitting free circulation of water into, and out of, the box and forming drop doors giving access, when open, to all parts of the interior of the box for thorough cleaning thereof after use.

EMIL E. MOUTOUX.